United States Patent
Li et al.

(10) Patent No.: US 12,422,330 B2
(45) Date of Patent: Sep. 23, 2025

(54) SYSTEM FOR ONLINE TESTING OF PACKAGING TIGHTNESS OF CIGARETTE BOXES

(71) Applicant: ZHENGZHOU TOBACCO RESEARCH INSTITUTE OF CNTC, Zhengzhou (CN)

(72) Inventors: Bin Li, Zhengzhou (CN); Shuang Wang, Zhengzhou (CN); Le Wang, Zhengzhou (CN); Ruilin Hu, Zhengzhou (CN); Jiakang Li, Zhengzhou (CN); Ke Zhang, Zhengzhou (CN); Nan Deng, Zhengzhou (CN); Feng Huang, Zhengzhou (CN); Qi Zhang, Henan (CN); Lili Fu, Zhengzhou (CN); Mingjian Zhang, Zhengzhou (CN); Bing Wang, Zhengzhou (CN)

(73) Assignee: ZHENGZHOU TOBACCO RESEARCH INSTITUTE OF CNTC (CN)

( * ) Notice: Subject to any disclaimer, the term of this patent is extended or adjusted under 35 U.S.C. 154(b) by 273 days.

(21) Appl. No.: 18/245,519

(22) PCT Filed: Apr. 15, 2021

(86) PCT No.: PCT/CN2021/087496
§ 371 (c)(1),
(2) Date: Mar. 15, 2023

(87) PCT Pub. No.: WO2022/057251
PCT Pub. Date: Mar. 24, 2022

(65) Prior Publication Data
US 2023/0366770 A1    Nov. 16, 2023

(30) Foreign Application Priority Data
Sep. 16, 2020 (CN) .......................... 202010971214.9

(51) Int. Cl.
*G01M 3/32* (2006.01)

(52) U.S. Cl.
CPC .................................. *G01M 3/32* (2013.01)

(58) Field of Classification Search
CPC .... G01M 3/32; G01M 3/3209; G01M 3/3272; G01M 3/3281
See application file for complete search history.

(56) References Cited

U.S. PATENT DOCUMENTS 9,927,409 B2 * 3/2018 Polman ................... G01M 3/34

* cited by examiner

Primary Examiner — David Z Huang
(74) Attorney, Agent, or Firm — FROST BROWN TODD LLP

(57) ABSTRACT

The present invention provides a system for on-line detecting the package airtightness of cigarette packet, which comprises a first conveyor belt; a plurality of detection box bases arranged on the first conveyor belt at preset intervals, wherein the cigarette packets are sequentially conveyed onto each detection box base; a second conveyor belt arranged above the first conveyor belt, and the central plane of the second conveyor belt being in coincide with the central plane of the first conveyor belt; a plurality of detection box covers arranged on the second conveyor belt at preset intervals, wherein each detection box cover is provided with a slit on one side face, and the detection box cover positioned on the lower end face of the second conveyor belt is cooperated with the detection box base directly below the second conveyor belt during the detection; and a detection probe aligned with the slit during the detection so as to detect the package airtightness of the cigarette packet positioned within the detection box cover through the slit. The detection system can detect the package airtightness of the cigarette packet on line packet by packet at high throughput, thereby realizing on-line quality control.

11 Claims, 2 Drawing Sheets

SYSTEM FOR ONLINE TESTING OF PACKAGING TIGHTNESS OF CIGARETTE BOXES

CROSS-REFERENCE TO RELATED APPLICATION(S)

This application is a U.S. National Phase Patent Application of International Application Number PCT/CN2021/087496, filed on Apr. 15, 2021, which claims priority of Chinese Patent Application Number 202010971214.9, filed on Sep. 16, 2020, the entire content of each of which is incorporated herein by reference.

TECHNICAL FIELD

The invention relates to the field of tobacco detection, in particular to a system for on-line monitoring the package airtightness of cigarette packet s.

BACKGROUND

Cigarette packaging is the last production procedure of finished cigarettes, and the airtightness of the cigarette packet package has important influence on the quality of the cigarettes. The accurate detection of the sealing degree of the cigarette packet packaging not only ensures the benefit of consumers, but also guides cigarette manufacturing enterprises to improve the cigarette packaging process and the quality of cigarette products.

According to the industry standard YC/T140-1998, namely *Inflation Testing Method for the Sealing Degree of Cigarette Packets*, promulgated by the State Tobacco Monopoly Administration, the method is only suitable for measuring the sealing degree of soft package cigarettes, and the test accuracy is not high, so that the method is abandoned. The Chinese patent (publication No. CN 104792470A) discloses a method for measuring the sealing degree of cigarette packet packages, which is based on pressure sensing of cigarette package sealing degree detection and can identify the position of an air leakage point. The Chinese patent (publication number: CN207662572U) discloses a cigarette package sealing degree detection device, which comprises a test main body A and a heat sealing instrument B, that can visually determine the sealing degree of the cigarette package and leakage positions. The Chinese patent (publication number: CN103969423B) discloses a method and a device for detecting the sealing degree of cigarette packaging transparent paper based on pressure sensing, in which the pressure difference is generated between the internal environment and the external environment of a cigarette packet; collecting the pressure value of the external environment of the cigarette packet in real time until the internal pressure and the external pressure of the cigarette packet are balanced; obtaining a pressure variation curve according to the external environment pressure value of the cigarette packet at each moment; and determining the sealing degree of the cigarette package transparent paper according to the pressure change rate.

All the methods are based on off-line laboratory analysis, which can not realize packet-by-packet detection of cigarette packet packages on a production line, so that only quality tracing of the sealing degree of the cigarette packet packages can be realized, and the online quality control can not be realized.

DISCLOSURE OF INVENTION

In order to solve above problems, the present invention provides a system for detecting the package airtightness of cigarette packets on line, which can detect the package airtightness of cigarette packets on line packet by packet with high throughput, thereby realizing on-line quality control.

The detection system according to the present invention comprises: a first conveyor belt; a plurality of detection box bases provided on the first conveyor belt at predetermined intervals, the cigarette packets to be detected being conveyed sequentially onto each of said plurality of detection box bases; a second conveyor belt arranged above said first conveyor belt, and the central plane of said second conveyor belt being coincided with the central plane of said first conveyor belt; a plurality of detection box covers arranged on the second conveyor belt at preset intervals, each detection box cover having a cuboid structure with an internal cavity and an opening at one end face thereof, and a slit being formed at one side surface thereof, wherein during the detection, said detection box cover located at a lower end face of the second conveyor belt is cooperated with the detection box base directly below through said opening so as to receive the cigarette packet within the cavity; and a detection probe, said detection probe is arranged directly below the lower end face, and is in contact with said one side surface of the detection box cover during detection, and is aligned with said slit so as to detect the package airtightness of the cigarette packet located within the detection box cover therethrough.

According to one embodiment, a detection probe may comprise: a sealing device being tangent to said one side surface to seal said detection box cover during the detection; a gas flow conducting device arrange at the center of the sealing device and communicating with said slit during the detection so as to provide a constant suction gas flow to the interior of the detection box cover; and a pressure monitoring element connected to the gas flow conducting device to monitor a pressure change of the gas flow conducting device.

Alternatively, the gas flow conducting device may comprise a negative pressure generating system and a flow controller for generating a constant gas flow.

Further, the pressure change is represented by the following formula:

$$p_t = p_e + (p_{t0} - p_e) \cdot \exp\left[-\frac{\sqrt{K_B T}}{\sqrt{2\pi \cdot m}} \cdot A \cdot \frac{p_{t0}}{(p_{t0} - p_e) \cdot V_1} \cdot t\right]$$

wherein, $p_t$ is a measured pressure outside the cigarette packet, $p_{t0}$ is an initial measured pressure outside the cigarette packed, $p_e$ is a final measured pressure when the pressures outside and inside the cigarette packed are balanced, $V_1$ is an outer volume of the cigarette packet body, t is a measuring time, $K_g$ is the Boltzmann constant ($1.38 \times 10^{-23}$ J/K), T is an absolute temperature of ideal gas, m is the average molecular mass ($29 \times 1.67 \times 10^{-27}$ kg) of air, and A is an area of a gas overflow hole of the cigarette packet.

According to another embodiment, each of the plurality of cassette bases may comprise: a hard bottom plate fixed on the first conveyor belt; a soft sealing pad arranged on said hard bottom plate; and a fixing member arranged on said soft sealing pad and used for fixing said cigarette packet.

Optionally, the detection system according to the present invention may further comprise a cigarette packet removal device arranged at the downstream of the first conveyor belt in the conveying direction of the cigarette packets so as to remove the cigarette packet with the sealing degree thereof exceeding a preset threshold value.

Preferably, the running speed of the first conveyor is the same as that of the second conveyor.

According to an example, during the detection, the time for the detection probe being in contact with the slit is between 0.05 s and 0.1 s.

Alternatively, the second conveyor belt may have an inverted trapezoidal structure.

According to another example, each of the plurality of detection box covers may be made of a hard material.

DRAWINGS

The above and other aspects and features of the present invention will become apparent from the following description of the embodiments with reference to the accompanying drawings, in which.

BEST MODE FOR CARRYING OUT THE INVENTION

The illustrative, non-limiting embodiments of the present invention will be described hereafter in detail with reference to the attached drawings, and a system for the on-line detection for the airtightness of the packaging of cigarette packets according to the present invention will be further illustrated below.

Figure 1:
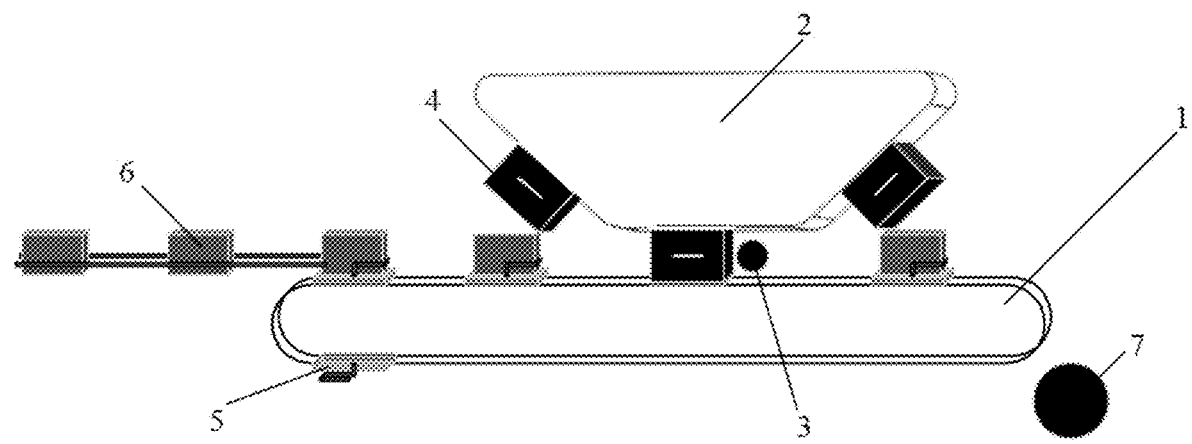
FIG. 1 is a schematic diagram of the overall structure of a detection system according to an embodiment of the present invention.

The detection system according to the present invention comprises a movement mechanism including a first conveyor belt 1 and a second conveyor belt 2, and a measurement mechanism including a plurality of detection boxes each of which is constituted by a detection box cover 4 and a detection box base 5, and a detection probe 3, as shown in FIG. 1.

Specifically, a plurality of detection box bases 5 are provided at predetermined intervals on the first conveyor belt 1, and cigarette packets 6 to be detected are conveyed in turn to each of the detection box bases 5. The second conveyor belt 2 is arranged above the first conveyor belt 1, and the center plane of the second conveyor belt coincides with the center plane of the first conveyor belt. For example, the second conveyor belt may have an inverted trapezoidal structure, as shown in FIG. 1. A plurality of detection box covers 4, each of which has a cuboid structure having an internal cavity and an opening at end face thereof, and has a slit 41 on one side surface, are provided on the second conveyor 2 at predetermined intervals. During the detection, the detection box cover 4, located at the lower end face of the second conveyor belt 2, cooperates with the detection box base directly therebelow through the opening so as to receive a cigarette packet within the cavity. The size of the detection box cover matches the size of the detection box base so as to fit over the detection box base during detecting. For example, the detection box cover can be made of hard materials, such as stainless steel, aluminum alloy, engineering plastics and the like. The detection probe 3 is arranged directly below said lower end face of the second conveyor belt 2 and is brought into contact with said one side surface of the detection box cover 4 during detection and aligned with the slit 41 to detect the airtightness of the package of the cigarette packet located within said detection box cover through the slit 41.

The detection system can adjust the number of the detection box covers, the number of the detection box bases, the running speed of the first conveyor belt and the running speed of the second conveyor belt according to actual needs. For example, the first conveyor may run at the same speed as the second conveyor. When the detection box cover 4 moves to the lower end face of the first conveyor belt 2, the detection box cover just fits with the detection box base 5. The running speed of the detection box is matched with the running speed of the cigarette boxes, so that the sequential detection of the package airtightness of the cigarette boxes is realized. Therefore, the detection system can detect the package airtightness of the cigarette boxes on line packet by packet with high throughput, thereby realizing on-line quality control.

Figure 2:
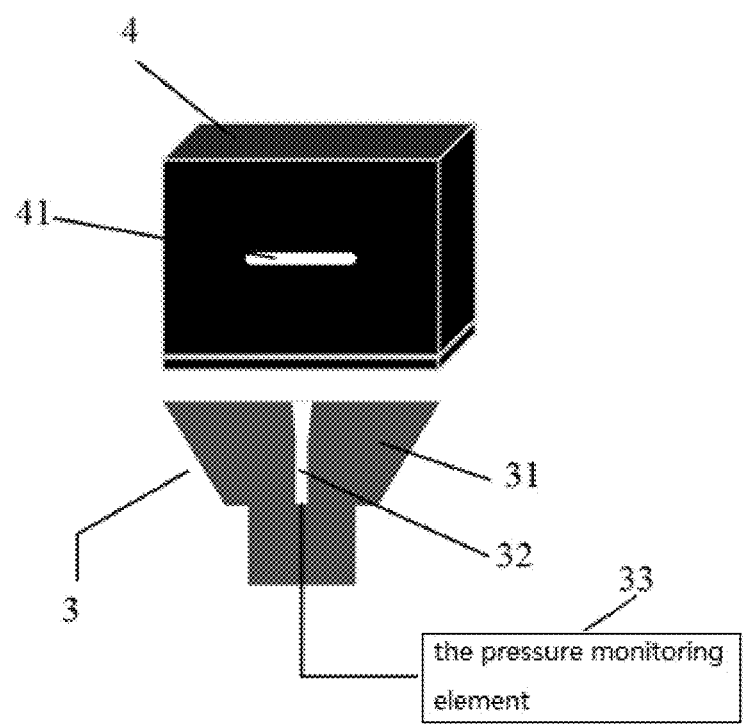
FIG. 2 is a schematic structural diagram of a measurement mechanism according to one embodiment of the present invention.
Figure 3:
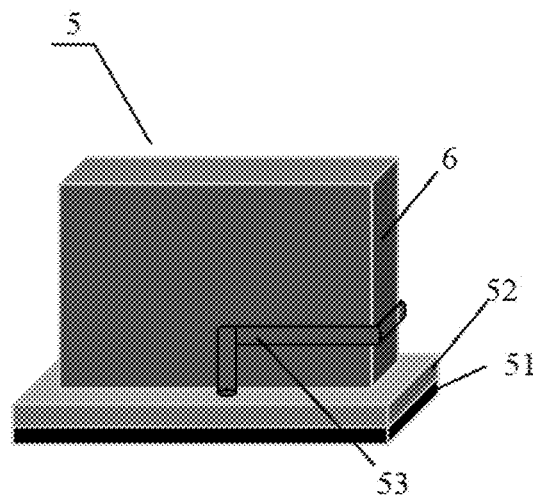
FIG. 3 is a schematic view of the construction of a detection box base according to another embodiment of the present invention.
Figure 4:
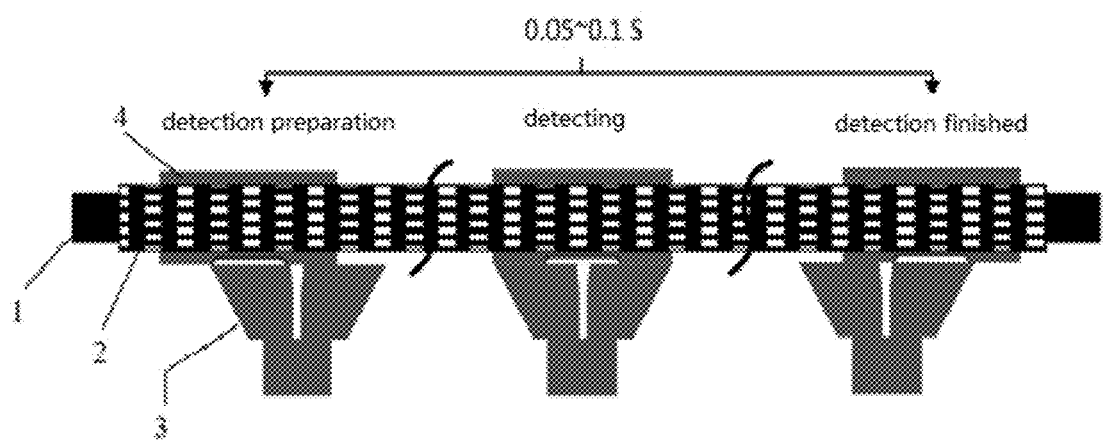
FIG. 4 is a schematic view of the detecting process of the detection system according to the present invention.

According to an embodiment of the present invention, the detection probe 3 may further include a sealing device 31, a gas flow conducting device 32, and a pressure monitoring element 33, as shown in FIG. 2. The sealing device 31 is tangent to the side surface of the detection box cover forming the slit 41 during detecting, so as to seal the detection box cover. The gas flow conducting device 32 is arranged at the center of the sealing device 31 and communicates with the slit 41 during detecting, so as to provide a constant suction gas flow to the interior of the detection box cover. Preferably, during the detection, the time for the detection probe contacting with the slit may be between 0.05 s and 0.1 s. According to an alternative embodiment, the gas flow conducting device 32 may comprise a negative pressure generating system and a flow controller for generating a constant gas flow. The pressure monitoring element 33 is connected to the gas flow conducting device 32 to monitor the pressure change of the gas flow conducting device. Since the cigarette packet package has certain gas permeability, the pressure change of the gas flow conducting device should be caused during the sealing process between detection probe and the detection box. Further, the pressure change is represented by the following formula:

$$p_t = p_e + (p_{t0} - p_e) \cdot \exp\left[-\frac{\sqrt{K_B T}}{\sqrt{2\pi \cdot m}} \cdot A \cdot \frac{p_{t0}}{(p_{t0} - p_e) \cdot V_1} \cdot t\right]$$

In the formula: $p_t$ is the measured pressure outside the cigarette packet, $p_{t0}$ is the initial measured pressure outside the cigarette packed, $p_e$ is the final measured pressure when the pressures outside and inside the cigarette packed are balanced, $V_1$ is the outer volume of the cigarette packet body, t is the measuring time, KB is the Boltzmann constant ($1.38*10^{-28}$ J/K), T is the absolute temperature of ideal gas, m is the average molecular mass ($29*1.67*10^{-27}$ kg) of air, and A is the area of a gas overflow hole of the cigarette packet. The area of the gas overflow hole of the cigarette packet can be obtained by fitting the pressure change detection curve, which can reflect the package airtightness of the cigarette packet.

According to another embodiment of the present invention, each detection box base 5 may include a hard bottom plate 51, a soft sealing pad 52, and a fixing member 53. The hard bottom plate 51 is fixed to the first conveyor belt 1, and the soft sealing pad 52 is provided on the hard bottom plate 51. The fixing member 53 is provided on the soft sealing pad 52 for fixing the cigarette packet 6. The size of the detection box cover is matched with that of the detection box base, and when the detection box cover is cooperated with the detection box base, the detection box cover squeezes the soft sealing pad 52 to realize the storage of the cigarette packed and the sealing of the detection box. The sealing of the detection box means that the cavity inside the detection box is communicated with the outside only through the slit on the side end face of the detection box cover.

According to a preferred embodiment, the detection system according to the invention may also comprise a cigarette packet removal device 7, which arranged at the downstream of the first conveyor belt 1 in the conveying direction of the cigarette packets, to remove the cigarette packet in which the sealing degree thereof exceeds a preset threshold.

Although exemplary embodiments of the present invention have been described, it will be appreciated by those skilled in the art that changes may be made in these embodiments without departing from the principles and spirit of the present invention, the scope of which is defined in the claims and their equivalents.

What is claimed is:

1. A system for on-line detecting the package airtightness of cigarette packets, comprising:
    a first conveyor belt;
    a plurality of detection box bases provided on the first conveyor belt at predetermined intervals, the cigarette packets to be detected being conveyed sequentially onto each of said plurality of detection box bases;
    a second conveyor belt arranged above said first conveyor belt, and the central plane of said second conveyor belt being coincided with the central plane of said first conveyor belt;
    a plurality of detection box covers arranged on the second conveyor belt at preset intervals, each detection box cover having a cuboid structure with an internal cavity and an opening at one end face thereof, and a slit being formed at one side surface thereof, wherein during the detection, said detection box cover located at a lower end face of the second conveyor belt is cooperated with the detection box base directly below through said opening so as to receive the cigarette packet within the cavity; and
    a detection probe, said detection probe is arranged directly below the lower end face, and is in contact with said one side surface of the detection box cover during detection, and is aligned with said slit so as to detect the package airtightness of the cigarette packet located within the detection box cover therethrough.

2. The system of claim 1, wherein said detection probe comprises:
    a sealing device being tangent to said one side surface to seal said detection box cover during the detection;
    a gas flow conducting device arrange at the center of the sealing device and communicating with said slit during the detection so as to provide a constant suction gas flow to the interior of the detection box cover; and
    a pressure monitoring element connected to the gas flow conducting device to monitor a pressure change of the gas flow conducting device.

3. The system of claim 2, wherein the gas flow conducting device comprises a negative pressure generating system and a flow controller for generating a constant gas flow.

4. The system of claim 2, wherein said pressure change is represented by the formula:

$$p_t = p_e + (p_{t0} - p_e) \cdot \exp\left[-\frac{\sqrt{K_B T}}{\sqrt{2\pi \cdot m}} \cdot A \cdot \frac{p_{t0}}{(p_{t0} - p_e) \cdot V_1} \cdot t\right]$$

wherein, $p_t$ is a measured pressure outside the cigarette packet, $p_{t0}$ is an initial measured pressure outside the cigarette packed, $p_e$ is a final measured pressure when the pressures outside and inside the cigarette packed are balanced, $V_1$ is an outer volume of the cigarette packet body, t is a measuring time, KB is the Boltzmann constant ($1.38*10^{-23}$ J/K), T is an absolute temperature of ideal gas, m is the average molecular mass ($29*1.67*10^{-27}$ kg) of air, and A is an area of a gas overflow hole of the cigarette packet.

5. The system of claim 1, wherein each of said plurality of detection box bases comprises:
    a hard bottom plate fixed on the first conveyor belt;
    a soft sealing pad arranged on said hard bottom plate; and
    a fixing member arranged on said soft sealing pad and used for fixing said cigarette packet.

6. The system of claim 1, further comprising:
    a cigarette packet removal device arranged at the downstream of the first conveyor belt in the conveying direction of the cigarette packets so as to remove the cigarette packet with the sealing degree thereof exceeding a preset threshold value.

7. The system of claim 1, wherein the running speed of the first conveyor is the same as that of the second conveyor.

8. The system of claim 1, wherein during the detection, the time for the detection probe being in contact with the slit is between 0.05 s and 0.1 s.

9. The system of claim 1, wherein the second conveyor belt has an inverted trapezoidal structure.

10. The system of claim 1, wherein each of the plurality of detection box covers is made of a hard material.

11. The system of claim 3, wherein said pressure change is represented by the formula:

$$p_t = p_e + (p_{t0} - p_e) \cdot \exp\left[-\frac{\sqrt{K_B T}}{\sqrt{2\pi \cdot m}} \cdot A \cdot \frac{p_{t0}}{(p_{t0} - p_e) \cdot V_1} \cdot t\right]$$

wherein, $p_t$ is a measured pressure outside the cigarette packet, $p_{t0}$ is an initial measured pressure outside the cigarette packed, $p_e$ is a final measured pressure when the pressures outside and inside the cigarette packed are balanced, $V_1$ is an outer volume of the cigarette packet body, t is a measuring time, KB is the Boltzmann constant ($1.38*10^{-23}$ J/K), T is an absolute temperature of ideal gas, m is the average molecular mass ($29*1.67*10^{-27}$ kg) of air, and A is an area of a gas overflow hole of the cigarette packet.

* * * * *